(12) United States Patent
Drumheller et al.

(10) Patent No.: US 7,643,970 B2
(45) Date of Patent: Jan. 5, 2010

(54) TAPE COURSE GENERATION METHOD AND APPARATUS FOR PROGRAMMING A COMPOSITE TAPE LAMINATION MACHINE

(75) Inventors: Michael Drumheller, Seattle, WA (US); Alan K. Jones, Seattle, WA (US); Frederick W. Klein, Seattle, WA (US)

(73) Assignee: The Boeing Company, Chicago, IL (US)

( * ) Notice: Subject to any disclaimer, the term of this patent is extended or adjusted under 35 U.S.C. 154(b) by 647 days.

(21) Appl. No.: 11/269,834

(22) Filed: Nov. 9, 2005

(65) Prior Publication Data

US 2007/0106407 A1 May 10, 2007

(51) Int. Cl.
*G06G 7/48* (2006.01)

(52) U.S. Cl. .................. 703/2; 703/1; 703/6; 703/7; 700/97; 700/98

(58) Field of Classification Search ............... 703/1, 703/2, 6, 7; 700/97, 98; 156/212
See application file for complete search history.

(56) References Cited

U.S. PATENT DOCUMENTS

| | | | |
|---|---|---|---|
| 4,696,707 A * | 9/1987 | Lewis et al. ............... 156/64 |
| 4,750,965 A * | 6/1988 | Pippel et al. .............. 156/361 |
| 4,849,913 A * | 7/1989 | Ward et al. ................ 700/98 |
| 4,867,834 A | 9/1989 | Alenskis et al. |
| 6,073,670 A * | 6/2000 | Koury ...................... 156/425 |
| 7,010,472 B1 * | 3/2006 | Vasey-Glandon et al. ...... 703/6 |
| 7,376,480 B2 * | 5/2008 | Hagen et al. ............... 700/118 |

OTHER PUBLICATIONS

Michael N. Grimshaw, "Automated Tape Laying", 2001, Cincinatti Machine, pp. 480-485.*
Michael N. Grimshaw et al., "Advanced Technology Tape Laying for Affordable Manufacturing of Large Composite Structures", 2001, pp. 1-11.*
Udi Manber, "Introduction to Algorithms—A Creative Approach", 1989, Addison-Wesley Publishing Co. Inc., pp. 265-270.*

* cited by examiner

*Primary Examiner*—Jason Proctor

(57) ABSTRACT

A tape course generator produces tape course definitions for use in programming a CNC composite tape lamination machine. The tape course generator includes a reference surface parameterizer that maps a contoured surface onto a parametric reference surface, and a reference plane instantiator that maps the reference surface onto a reference plane. The tape course generator also includes a tape boundary plotter that plots a tape boundary, and a boundary mapper that maps the tape boundary and a ply boundary into the reference plane. In addition, the tape course generator includes an intersection locator that identifies intersections of the ply boundary and the tape boundary, and a tape course delimiter that defines tape cuts and determines which points in the reference plane are within a tape course. Moreover, the tape course generator includes a tape course transformer that maps the defined tape course back onto the contoured surface.

52 Claims, 8 Drawing Sheets

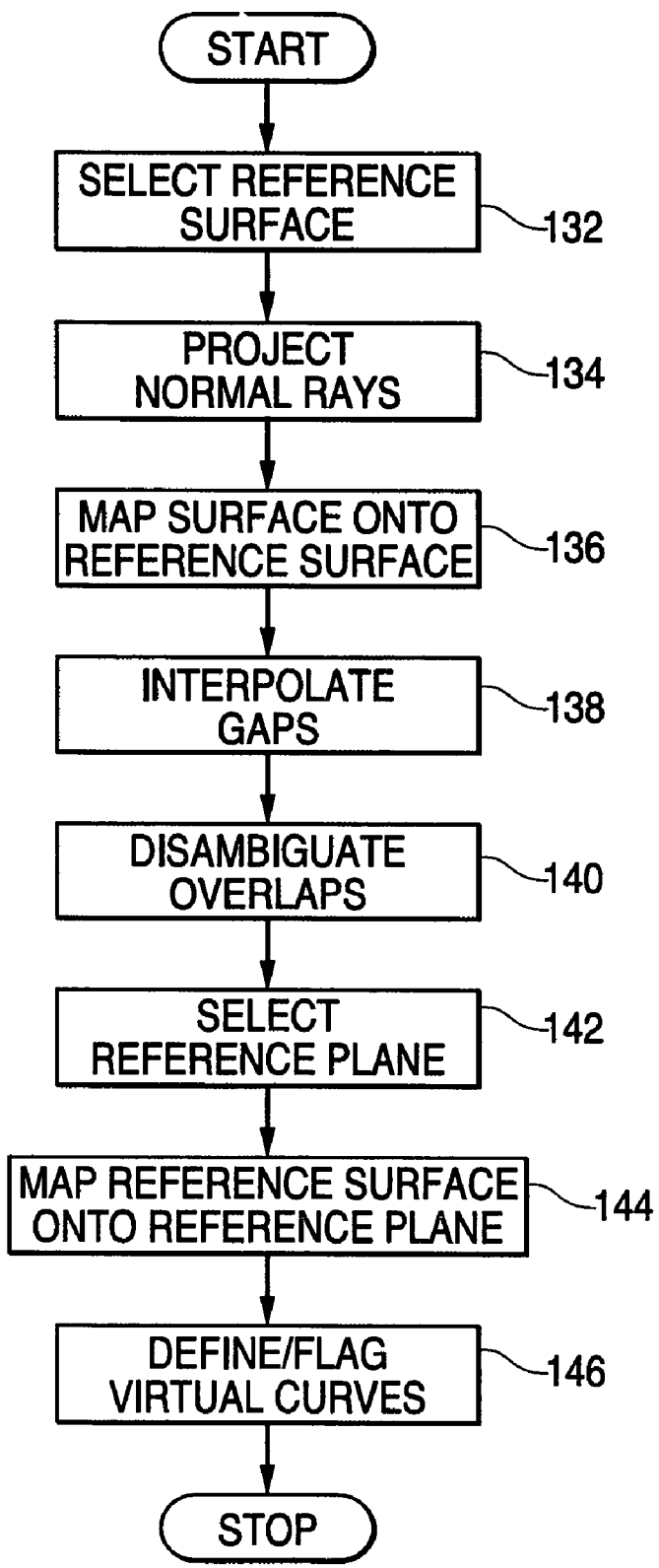

TAPE COURSE GENERATION METHOD AND APPARATUS FOR PROGRAMMING A COMPOSITE TAPE LAMINATION MACHINE

FIELD OF THE INVENTION

The present invention relates generally to composite part manufacturing. More particularly, the present invention relates to generating tape course definitions for use in computer-numerical-control composite part programs for composite tape lamination machines.

BACKGROUND OF THE INVENTION

Composite materials have been used increasingly in a variety of industries, including the automotive, marine and aerospace industries. In some instances, composite parts can be formed using automated composite material application machines, such as composite tape lamination machines or composite fiber placement machines.

Some existing composite material application machines, for example, a flat tape lamination machine (FTLM) or a contoured tape lamination machine (CTLM), can be capable of producing flat or gently contoured composite parts by laying relatively wide strips of composite tape onto generally horizontal or vertical tooling surfaces, such as a mandrel. In addition, some tape lamination machines can be capable of laying relatively narrow strips, or "tows," of composite tape onto a more complex contoured surface, including generally cylindrical or spherical surfaces.

In order to more efficiently produce relatively large composite parts, including aircraft fuselage sections, a high-rate, multihead, composite material application machine has been conceived. As conceived, the multihead composite material application machine should be capable of manufacturing a wide variety of composite parts, such as flat spars, stringer charges, wing skins and fuselage barrel sections, as well as composite parts in other industries, such as the automotive, marine, industrial vehicle and prefabricated architectural structure industries.

However, existing composite part programming systems do not have the capacity to efficiently define tape courses for a relatively complex surface to program a composite material application machine with multiple composite material application heads to form a variety of composite parts. Accordingly, it is desirable to provide a method and apparatus that can efficiently generate tape course definitions for a relatively complex surface for use in producing a composite part program for a high-rate composite material application machine with multiple composite material application heads to form a variety of composite parts without requiring excessive manual programming.

SUMMARY OF THE INVENTION

The foregoing needs are met, to a great extent, by the present invention, wherein in one aspect an apparatus is provided that in some embodiments can efficiently generate tape course definitions for a relatively complex surface for use in producing a composite part program for a high-rate composite material application machine with multiple composite material application heads to form a variety of composite parts.

In accordance with one aspect of the present invention, computer-implemented method of defining a composite tape course to form at least a portion of a composite part ply can include approximating a contoured surface with a reference plane, mapping a ply boundary from the contoured surface to a reference ply boundary in the reference plane and mapping to a reference tape boundary in the reference plane. In addition, the method can include defining a tape edge based at least in part on an reference intersection of the reference ply boundary and the reference tape boundary.

In accordance with another aspect of the present invention, computer program product for defining a composite tape course to form at least a portion of a composite part ply, including a computer-readable medium encoded with instructions configured to be executed by a processor in order to perform predetermined operations, which can include approximating a contoured surface with a reference plane, mapping a ply boundary from the contoured surface to a reference ply boundary in the reference plane, and mapping a tape boundary from the contoured surface to a reference tape boundary in the reference plane. In addition, the predetermined operations can include defining a tape edge based at least in part on an reference intersection of the reference ply boundary and the reference tape boundary.

In accordance with yet another aspect of the present invention, tape course generator for defining a composite tape course to form at least a portion of a composite part ply can include a reference surface parameterizer configured to approximate a contoured surface with a reference surface, map a ply boundary from the contoured surface to an intermediate ply boundary on the reference surface, and map a tape boundary from the contoured surface to an intermediate tape boundary on the reference surface. The tape course generator can further include a reference plane instantiator configured to approximate the reference surface with a reference plane, map the intermediate ply boundary to a reference ply boundary in the reference plane, and map the intermediate tape boundary to a reference tape boundary in the reference plane. In addition, the tape course generator can include a tape course delimiter configured to define tape edge based at least in part on an reference intersection of the reference ply boundary and the reference tape boundary.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 11 is a flowchart illustrating steps that may be followed to parameterize a surface in the method FIG. 10.

DETAILED DESCRIPTION

Figure 1:
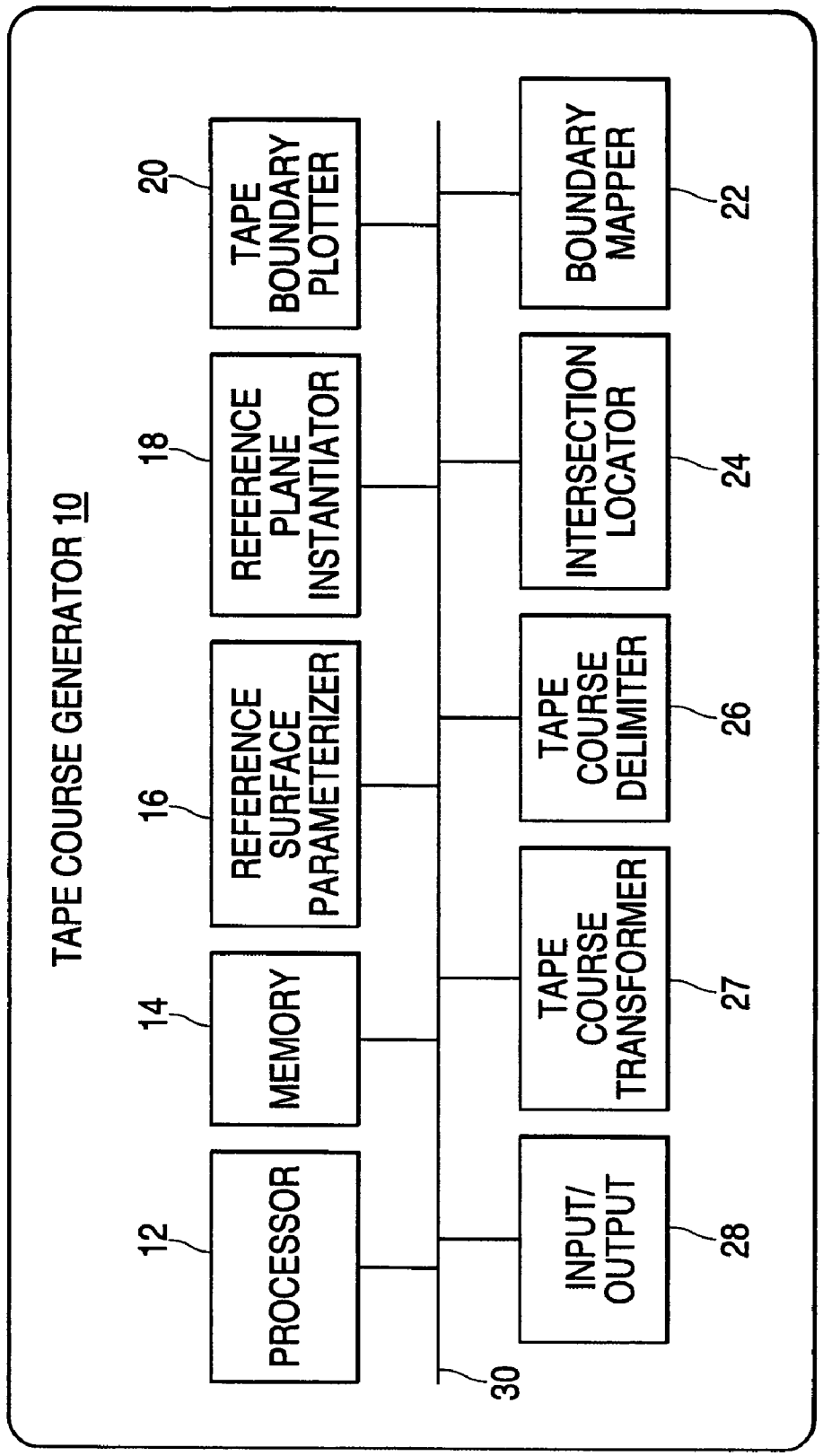
FIG. 1 is a block diagram illustrating a tape course generator of a type suitable for carrying out the functions of an embodiment of the invention.

An embodiment in accordance with the present invention provides a composite tape course generator that can produce tape course definitions for use in programming a single-head or multihead computer-numerical control (CNC) composite material application machine, such as a composite tape lamination machine. The tape course generator is capable of producing composite tape course definitions for a wide variety of large, complex composite parts, including relatively flat, contoured or generally cylindrical composite parts, or composite parts having relatively complex contoured surfaces.

The tape course generator can include a reference surface parameterizer that can map a real contoured surface, for example, a composite manufacturing tool surface or a composite part surface, onto a parametric reference surface. The tape course generator can also include a reference plane instantiator that can map the reference surface onto a reference plane. Thus, the tape course generator can ultimately map the real contoured surface onto a parametric reference plane, and in so doing, the tape course generator can reduce a relatively complex, three-dimensional analysis of topology on the contoured surface to an instance of a more easily computed two-dimensional, or planar, analysis.

In addition, the tape course generator can include a tape boundary plotter that can plot a virtual outline of a tape segment, or tape boundary, based on a tool path defined on the contoured surface, as well as a boundary mapper that can map the tape boundary and a ply boundary defined on the contoured surface into the reference plane. The tape course generator can further include an intersection locator that can analyze the boundaries in the reference plane to identify intersections of the ply boundary and the tape boundary, which can be used to define tape cuts and specify composite material application machine composite material application head position requirements. Furthermore, the tape course generator can include a tape course delimiter that can determine whether or not a point in the reference plane lies within a closed curve, and thus can determine which points in the reference plane are part of the tape course. Moreover, the tape course generator can include a tape course transformer that can map the defined tape course back onto the contoured surface. Thus, the tape course generator can define the individual tape courses that will be laid to cover each ply.

The invention will now be described with reference to the drawing figures, in which like reference numerals refer to like parts throughout. An embodiment in accordance with the present invention provides a composite tape course generator that can produce tape course definitions for use in creating a composite part program to control a CNC composite material application machine, such as a composite tape lamination machine, or tape-laying machine, having a single composite material application head, or having multiple composite material application heads. For example, an embodiment of the present invention can be used in conjunction with the method disclosed in U.S. Pat. No. 7,376,480 entitled, "Multihead Composite Material Application Machine Programming Method and Apparatus for Manufacturing Composite Structures," the disclosure of which is hereby incorporated by reference in its entirety.

FIG. 1 illustrates a representative embodiment of a tape course generator 10, including a processor 12, a memory 14, a reference surface parameterizer 16, a reference plane instantiator 18, a tape boundary plotter 20, boundary mapper 22, an intersection locator 24, a tape course delimiter 26, a tape course transformer 27 and an input/output (I/O) device 28, all of which are interconnected by a data link 30. The processor 12, the memory 14 and the input/output device 28 can be part of a general computer, such as a personal computer (PC), a server, a mainframe computer, a personal digital assistant (PDA), or some combination of these. The remaining components can include programming code, such as source code, object code or executable code, stored on a computer-readable medium that can be loaded into the memory 14 and processed by the processor 12 in order to perform the desired functions of the tape course generator 10.

In operation, the tape course generator 10 can receive a manufacturing tool surface definition and multiple composite ply definitions associated with a composite part definition, for example, in a computer-aided design (CAD) format or in a format converted from a CAD composite part design definition to be compatible with the tape course generator 10. In addition, the tape course generator 10 can further receive a set of machine-independent tool paths defined over the manufacturing tool surface or over a composite ply surface, which the composite material application heads can follow to apply the composite material over the manufacturing tool surface, or over a previous ply surface, in order to form a composite part. Thus, for example, the surface area of each ply can be populated with paths that are spaced apart by the nominal width of a standard composite tape within a tolerance that complies with gap or overlap specifications or limits.

Figure 2:
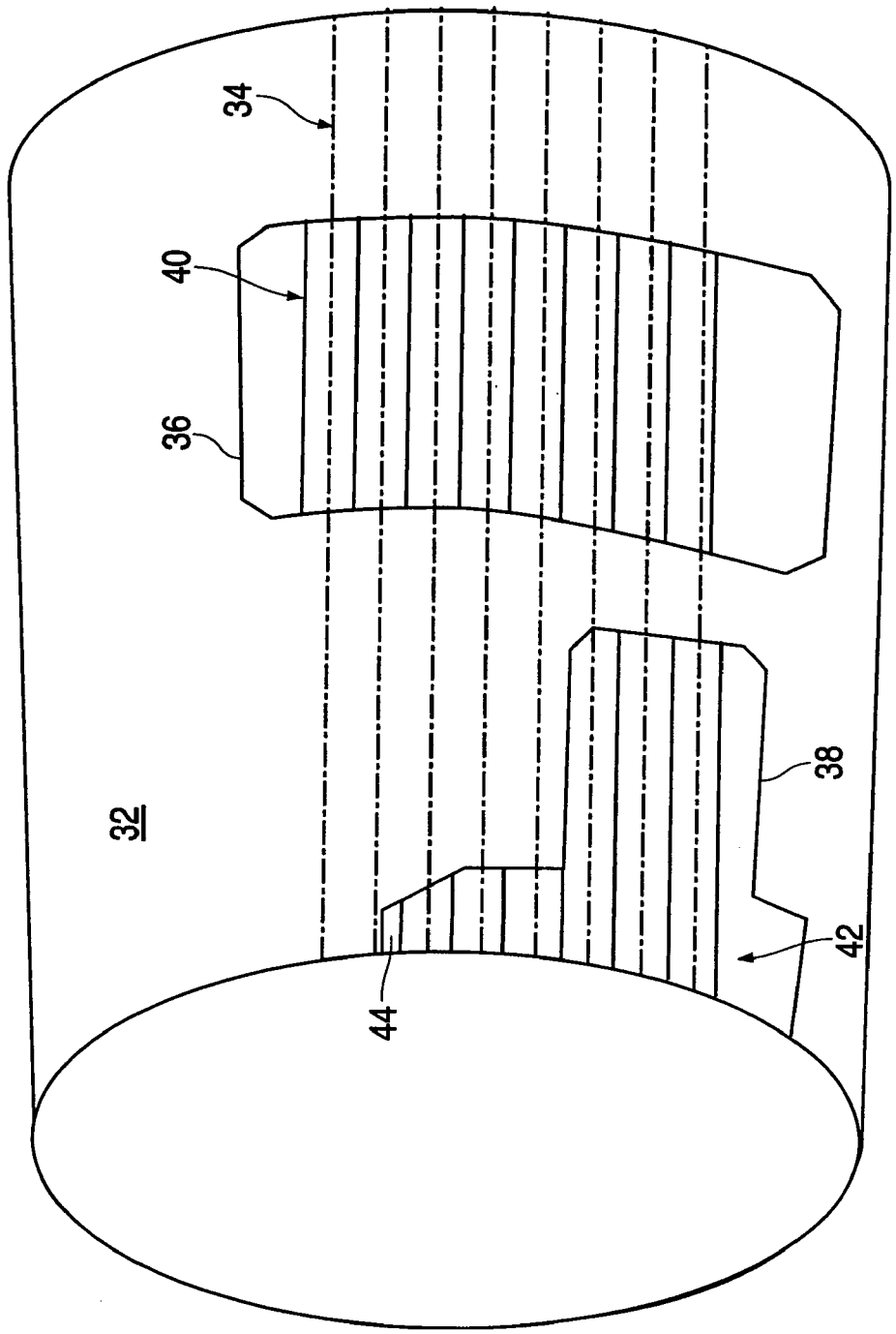
FIG. 2 is a perspective view illustrating a large, generally cylindrical composite part showing tape courses that can be defined by a preferred embodiment of the invention.

For example, FIG. 2 illustrates a manufacturing tool 32, or mandrel, for a large, generally cylindrical composite part with eight representative tool paths 34 designated in a generally horizontal direction across the surface of the manufacturing tool 32. FIG. 2 further illustrates a first ply boundary 36 and a second ply boundary 38. Eight contiguous composite tape courses 40, which correspond to the tool paths 34, are delineated within the first ply boundary 36. Likewise, seven contiguous composite tape courses 42 are delineated within the second ply boundary 38, including a nonstandard tape course 44 having a width that is less than the distance between each of the adjacent pairs of tool paths 34, or the nominal composite tape width.

As an example, a composite tape lamination machine may have one or more composite material application heads attached to a tool carriage and configured to apply composite tape having a standard or nominal width of three inches, six inches, or any other suitable width. The composite tape lamination machine may further include a composite material application head that applies a strip or multiple strips of composite tape having a nonstandard width. For example, a representative multihead composite tape lamination machine may include one or more standard heads that apply nominal three-inch wide strips of composite tape, as well as one or more specialized heads that apply strips of composite tape of nonstandard width, such as one-eighth inch or one-quarter inch wide strips, or "tows." In addition, a specialized head may have the capacity to apply multiple nonstandard strips up to an aggregate width equal to the nominal tape width, for example, up to twenty-four one-eighth-inch composite tape tows on a machine having a standard nominal tape width of three inches.

Although the tool paths 34 and tape courses 40, 42 shown in FIG. 2 are generally horizontal, or parallel to the axis of the manufacturing tool 32 (for reference in this example, the zero-degree fiber orientation), additional plies may have other fiber orientations, such as ninety degrees or forty-five degrees, or any suitable fiber orientation to satisfy the composite part design requirements.

The tape course generator 10 can subsequently define a set of tape courses 40, 42, 44 that correspond to the machine-independent tool paths and the composite part plies. That is, the tape course generator 10 can define a series of cuts and composite material application head actuation requirements, such as composite material application head-up and head-down locations and tape-cutting locations along each path so that only the part of the path that lies within the ply boundaries 36, 38 is actually populated with composite tape.

In one embodiment, the tape course generator 10 can implement a Cartesian coordinate system, for example, to produce generally flat or contoured parts. In other embodiments, the tape course generator 10 can implement any suitable coordinate system, for example, a polar coordinate system, such as an angular reference system, for example, to produce generally cylindrical parts on a rotating manufacturing tool 28, a circular coordinate system, a spherical coordinate system; a curvilinear coordinate system; or the like.

Figure 3:
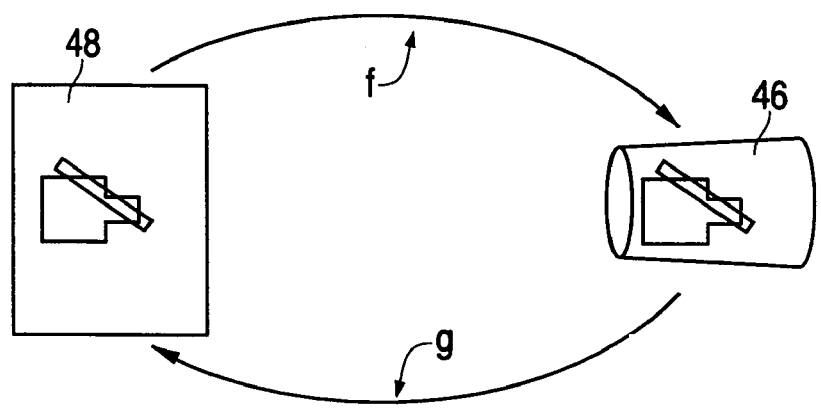
FIG. 3 is a diagrammatic representation of mapping functions between a contoured surface and a reference plane.

As depicted in FIG. 3, the tape course generator 10 can approximate a real contoured surface 46, such as a true manufacturing tool shape or a true composite part shape, with a two-dimensional (2-D) parametric reference surface, or reference plane 48. A parametric surface is a surface for which coordinates of the constituent points can be precisely defined by an equation, or by a set of equations, that are functions of two independent variables, or parameters.

The tape course generator 10 can develop a mapping algorithm, or function g, that maps the contoured surface 46 onto the reference plane 48. Thus, the mapping function, g, can correlate the three-dimensional (3-D) coordinates of the contoured surface 46 to the planar coordinates of the reference plane 48. That is to say the tape course generator 10 can parameterize the contoured surface, or in other words, the function, g, can assign parameters, for example, planar coordinates, to each point defined on the contoured surface 46.

Similarly, the tape course generator 10 can develop an inverse mapping algorithm, or inverse function, $f$, that maps the reference plane 48 onto the contoured surface 46. In some embodiments of the tape course generator 10, the inverse function, $f$, can first be determined, and the function, g, can be determined from the function, $f$. That is, the mapping function, g, can be defined as the inverse of the function, $f$. In general, the function, g, can be referred to as a parameterization of the contoured surface 46, because the function, g, assigns parameters to each point on the contoured surface 46.

Ideally, the mapping functions, $f$ and g, can establish a one-to-one correspondence between the points on the contoured surface 46 and the points in the reference plane 48. If so, the mapping function, g, correlates exactly one point on the contoured surface 46 to exactly one point in the reference plane 48, and the inverse function, $f$, correlates exactly one point in the reference plane 48 to exactly one point on the contoured surface 46, for all points on the contoured surface 46 and in the reference plane 48.

Moreover, the mapping functions, $f$ and g, should ideally be continuous over the respective surfaces. This means that neighboring points on the contoured surface 46 are correlated to neighboring points in the reference plane 48. If the mapping functions, $f$ and g, have one-to-one correspondence and are continuous, then all topological relationships of the contoured surface 46 will be preserved when mapped into the reference plane 48, and vice versa. Finally, the mapping functions, $f$ and g, should also be efficient to compute, so that method can be used in a practical computer program.

In relatively simple cases, such as nearly flat or subtly curved surfaces, suitable mapping functions, $f$ and g, can be determined using conventional methods. For example, for a nearly flat surface, normal projection onto a suitable reference plane has been successfully implemented. However, straightforward normal projection onto a reference plane may not suffice in the case of a more complex surface, for example, a generally cylindrical surface, because the resulting mapping functions, $f$ and g, will not have one-to-one correspondence.

As an example, if the contoured surface of an airplane fuselage were projected directly downward onto a tarmac (the reference plane), certain points on the upper and lower surfaces of the fuselage would be projected to a single point on the ground, since a vertical line generally would pierce the fuselage in two places. Thus, the resulting mapping function would be at best two-to-one (as would the inverse mapping function). Therefore, in order to approximate a more complex surface with a mapping function having a one-to-one correspondence, a different type of reference surface must be used.

Figure 4:
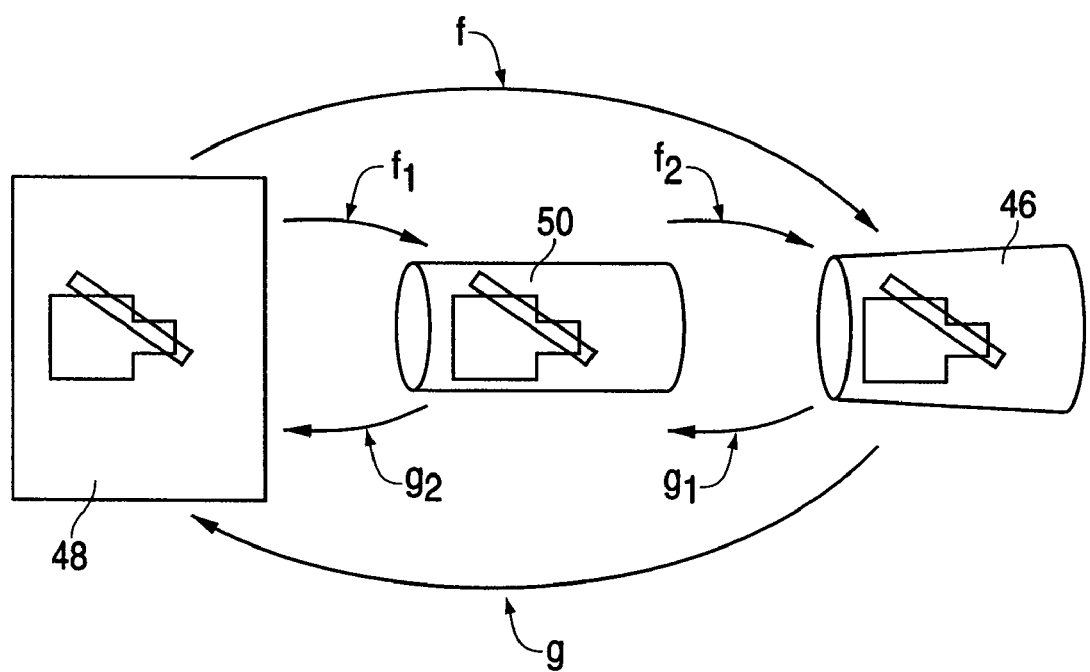
FIG. 4 is a diagrammatic representation of mapping functions between a contoured surface, a reference surface and a reference plane.

In order to address this difficulty, the tape course generator 10 can divide the task of approximating the real contoured surface 46 with a reference plane 48 among two modules. For example, as depicted in FIG. 4, the reference surface parameterizer 16 (see FIG. 1) can approximate the real contoured surface 46 with a three-dimensional (3-D) parametric reference surface 50, and the reference plane instantiator 18 (see FIG. 1) can approximate the reference surface 50 with an appropriate reference plane 48. That is, the reference surface parameterizer 16 can determine mapping functions, $g_1$ and $f_2$, to map the contoured surface 46 onto the reference surface 50 and vice versa, and the reference plane instantiator 18 can determine mapping functions, $g_2$ and $f_1$, to map the reference surface 50 onto the reference plane 48 and vice versa.

Thus, the reference surface parameterizer 16 can select a relatively simple, reference surface shape, compared to that of the contoured surface. In particular, the reference surface parameterizer 16 can select a reference surface shape that is sufficiently similar to the general shape of the contoured surface 46 as to retain as much as possible of the geometry, and which can be readily defined or parameterized, or at least can be reasonably conveniently evaluated. For example, in some embodiments of the tape course generator 10, the reference surface parameterizer 16 can select a relatively simple geometric surface, such as a cylinder, a sphere a hemisphere or a cone to approximate the contoured surface 46. Other embodiments can use a combination of such surfaces to approximate a contoured surface that is not sufficiently similar to a single parametric surface.

The key advantage of selecting a relatively simple surface shape is that the resulting mapping functions, $f$ and $g$, can require relatively easy, or even trivial, computations. Thus, the computational capacity required to support an embodiment of the tape course generator 10 can be significantly reduced, as compared to some alternative analytical methods.

In other embodiments of the tape course generator 10, the reference surface parameterizer 16 can select any suitable parametric surface that can be modeled by a mathematical function, such as a hemisphere, a polyhedron, a torus, a spheroid, an ellipsoid, a paraboloid, a hyperboloid. For some topologically cylindrical surfaces, in an alternative embodiment, the reference surface parameterizer 16 can select a swept surface, including, for example, a constant cross section defined about a curved longitudinal spine to approximate the contoured surface 46.

Consequently, the reference surface parameterizer 16 can construct, or define, the reference surface 50 based on the geometry of the contoured surface 46. That is, the reference surface parameterizer 16 can develop a mapping algorithm, or function $g_1$, that maps the contoured surface 46 onto the reference surface 50, as shown in FIG. 4. Similarly, the reference surface parameterizer 16 can develop an inverse mapping algorithm, or inverse function $f_2$, that maps the reference surface 50 onto the contoured surface 46.

In some embodiments, the reference surface parameterizer 16 can define the mapping functions, $g_1$, and $f_2$, by superimposing the contoured surface 46 over the reference surface 50 and casting, or projecting, rays normal to the reference surface 50. In other embodiments, reference surface parameterizer 16 can cast rays normal to the axis of the reference surface 50. For example, in the case where the reference surface 50 is a cylinder or a swept surface with circular cross sections, the reference surface parameterizer 16 can project rays from the axis of the cylinder, or from the spine of the swept surface, to the reference surface 50. Likewise, for a spherical reference surface, reference surface parameterizer 16 can project rays from the center of the sphere to obtain the mapping functions, $g_1$ and $f_2$. In general, the reference surface parameterizer 16 can identify the correlated points where each of the normal rays intersects the reference surface 50 and the contoured surface 46 to derive the mapping functions, $g_1$ and $f_2$. In some embodiments, the mapping function, $f_2$, can be empirically determined, and the mapping function, $g_1$, can be defined as the inverse of the mapping function, $f_2$.

For still more general surfaces, in another alternative embodiment of the tape course generator 10, the reference surface parameterizer 16 can construct a best-fit, single-spline surface with an appropriate parameter domain based on a sampling of the contoured surface 46. In this embodiment, the reference surface parameterizer 16 can define the mapping functions, $g_1$ and $f_2$, by superimposing the contoured surface 46 over the best-fit, single-spline surface and projecting normal rays from the reference surface 50. However, the rays must be projected in both the inward direction and in the outward direction from the reference surface 50, because the spline may be inside the reference surface 50 at some points and outside the reference surface at other points. Once again, the reference surface parameterizer 16 can identify the correlated points where each of the normal rays intersects the reference surface 50 and the contoured surface 46 to obtain the mapping functions, $g_1$ and $f_2$.

However, when projecting rays in both directions from the reference surface 50, the reference surface parameterizer 16 may also identify extraneous intersections of the rays with an opposite side of the contoured surface. Thus, the reference surface parameterizer 16 can be modified to apply a limiting threshold on the maximum acceptable distance between the reference surface 50 and the contoured surface 46, thereby rejecting the extraneous surface intersections.

In addition, the reference surface parameterizer 16 can verify that the normal projection onto the reference surface 50 has a one-to-one correspondence with the contoured surface 46 and that the mapping functions, $g_1$ and $f_2$, are continuous, that is, mapping functions, $g_1$ and $f_2$, are uniquely defined on the respective surfaces. In order to accomplish this, normal rays from all points of the reference surface 50, or all points along the axis of the reference surface 50, must each intersect a unique point of the contoured surface 46. For example, in the case of a cylinder approximately concentrically superimposed as a reference surface over an airplane fuselage, any normal ray projected from the axis of the cylinder would intersect the fuselage surface at a single point that is unique from the intersections of all other normal rays that can be projected from the cylinder axis, resulting in one-to-one mapping functions, $g_1$ and $f_2$. In general, the reference surface parameterizer 16 can select the reference surface 50 to have a shape sufficiently similar to the contoured surface 46 such that the mapping functions, $g_1$ and $f_2$, can have one-to-one correspondence.

Figure 5:
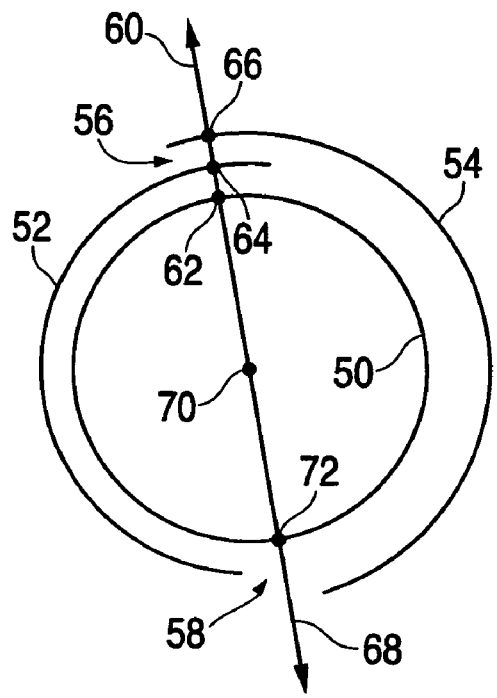
FIG. 5 is a cross-sectional view of a contoured surface comprised of two partial surfaces superimposed over a reference surface.

In some cases, the reference surface parameterizer 16 can make adjustments to the mapping functions, $g_1$ and $f_2$, in order to establish a one-to-one correspondence. For example, a CAD surface definition for the contoured surface 46 can consist of multiple partial surfaces—even thousands of partial surfaces—that jointly define the complex contoured surface 46. An example of a surface definition comprised of two partial surfaces 52, 54 is illustrated in FIG. 5. Furthermore, some of the partial surfaces may unintentionally overlap, as illustrated by the overlap 56 of the upper tip of the right partial surface 54 over the upper tip of the left partial surface 52 in FIG. 5.

In this case, when a ray 60 is projected, for example, from the axis 70 of the cylindrical reference surface 50, passing through a point 62 on the reference surface 50 in an outward-pointing direction normal to the reference surface 50, the ray 60 can intersect both partial surfaces 52, 54. For example, the ray 60 can intersect the left partial surface 52 at point 64, and intersect the right partial surface at point 66, as further illustrated in FIG. 5. In this case, the mapping function, $f_2$, does not have one-to-one correspondence. Thus, the reference surface parameterizer 16 can adjust the mapping function, $f_2$, by calculating a weighted average of the multiple intersection points 64, 66 in order to establish a one-to-one correspondence.

In other cases, the reference surface parameterizer 16 can make adjustments to the mapping functions, $g_1$ and $f_2$, in order to make the functions continuous. For example, some of the partial surfaces of a CAD surface definition for the contoured surface 46 may be spaced apart by an unintended gap, as illustrated by the gap 58 between the lower tips of the left and right partial surfaces 52, 54 in FIG. 5. That is, the contoured surface 46 is not defined at all points. In this case, when a ray 68 is projected, for example, from the axis 70 of the cylindrical reference surface 50, passing through a point 72 on the reference surface 50 in an outward-pointing direction normal to the reference surface 50, the ray 68 can fail to intersect either of the partial surfaces 52, 54, as further illustrated in FIG. 5. In this case, the mapping function, $f_2$, is not continuous. Thus, the reference surface parameterizer 16 can adjust the mapping function, $f_2$, by interpolating between tips of the nearby surfaces 52, 54 in order to derive continuous functions.

Nevertheless, the resulting reference surface 50 is not a planar surface, as is desirable in order to reduce the analysis of the contoured surface 46 to an elementary mathematical problem. Thus, as mentioned above, the reference plane instantiator 18 can approximate the reference surface 50 with an appropriate reference plane 48, as depicted in FIG. 4. In accordance with the shape of the reference surface 50, the reference plane instantiator 18 can effectively unroll, unfold, or flatten out the reference surface 50 to create a representative 2-D surface, or reference plane 48 that corresponds to the reference surface 50. For example, in the case of a cylindrical reference surface 50, the reference plane 48 can be rectangular, as shown in FIG. 4, such that the reference plane 48 can be effectively wrapped around the cylindrical reference surface 50. For other reference surface shapes, any suitable reference plane shape that can accurately represent the reference surface 50 can be selected as the reference plane 48.

Since the reference surface 50 can be selected to be a parametric surface, the reference plane instantiator 18 can use a conventional parametric equation, or set of equations, to correlate the reference surface 50 to the reference plane 48. For example, if the reference surface 50 is chosen to be a cylinder and the reference plane 48 is chosen to be a rectangular plane, as shown in FIG. 4, $f_1$ can be reduced to a map of conventional cylindrical coordinates according to the well-known equation, $$f_1(u,v)=(u,\sin(v),\cos(v)).$$

Thus, the mapping functions, $f$ and $g$, which can correlate the contoured surface 46 to the reference plane 48, can be can be replaced by, or decomposed into, the two pairs of mapping functions, $f_1$ and $f_2$, and $g_1$ and $g_2$, which can conjunctively produce the same correlation of the contoured surface 46 to the reference plane 48. For example, the mapping function, $g_1$, can first be applied to the contoured surface 46, after which the mapping function, $g_2$, can be applied to the reference surface 50 in order to correlate the contoured surface 46 to the reference plane 50. Likewise, the mapping function, $f_1$, can first be applied to the reference plane 48, after which the mapping function, $f_2$, can be applied to the reference surface 50 in order to correlate reference plane 50 to the contoured surface 46.

Furthermore, if each of the mapping functions, $f_1$, and $f_2$, (or $g_1$ and $g_2$) has one-to-one correspondence, then by definition the overall mapping, $f$, (or $g$) between the contoured surface 46 and the reference plane 48 also will have one-to-one correspondence. Moreover, if each of the mapping functions, $f_1$ and $f_2$, (or $g_1$ and $g_2$) is continuous, then by definition the overall mapping, $f$ (or $g$) between the contoured surface 46 and the reference plane 48 also will be continuous.

However, in some cases it is not possible to define mapping functions, $f_1$ and $f_2$, (or $g_1$ and $g_2$) that have a one-to-one correspondence. For example, a closed sphere cannot be mapped onto a planar surface with a one-to-one correspondence, even in principle (for well-known, fundamental mathematical reasons). Furthermore, even when a one-to-one mapping is possible, as in the case of mapping a cylinder or a hemisphere onto a plane, the mapping functions, $f_1$ and $g_2$, that are desirable for purposes of an embodiment of the present invention may not have a one-to-one correspondence across the entire surface.

Thus, the reference surface parameterizer 16 can select a reference surface 50 and the reference plane instantiator 18 can select a reference plane 48 that contain singularities, or regions at which the mapping functions, $f_1$ and $g_2$, do not have one-to-one correspondence or are not continuous. In particular, the mapping functions, $f_1$ and $g_2$, can be continuous and have one-to-one correspondence at all points of the reference plane 48 and the reference surface 50, with the exception of a limited number of isolated singularities, such as the seam 74 on the cylindrical reference surface 50 and reference plane borders 76, 78 of FIG. 6.

Figure 6:
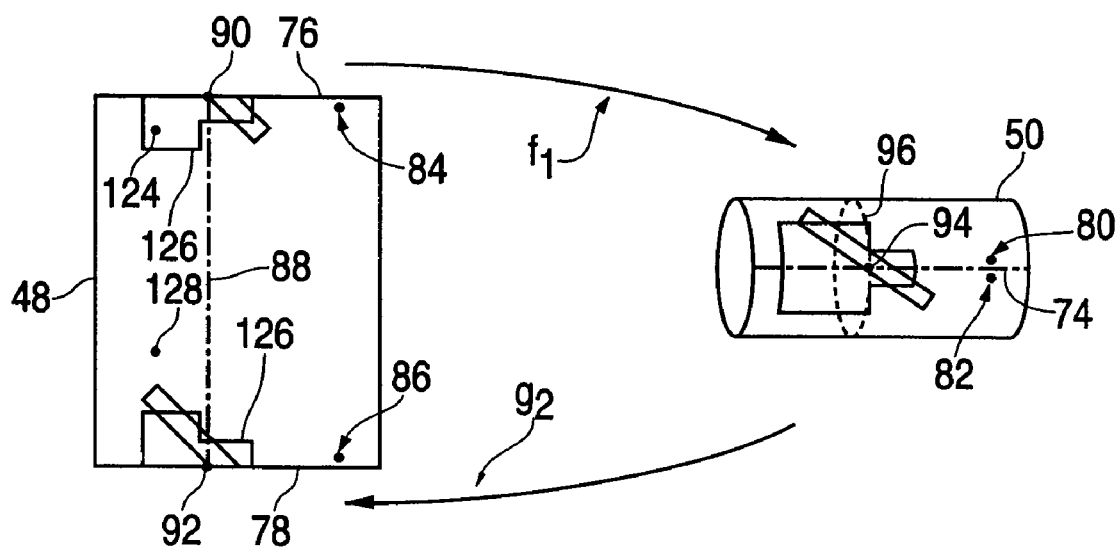
FIG. 6 is a diagrammatic representation of mapping functions between a contoured surface and a reference plane including singularities.

For example, singularities can include locations at which the mapping functions, $f_1$ and $g_2$, correlate two points, lines, or curves in the reference plane 48 to a single point, line or curve on the reference surface 50, such that the mapping functions, $f_1$ and $g_2$, do not have one-to-one correlation. As a specific example, in the case of a reference surface 50 that is represented by cylindrical coordinates, as shown in FIG. 6, the upper border 76 and the lower border 78 of the reference plane 48 can both correlate to a single line, or seam 74, on the reference surface 50. Similarly, singularities in the form of poles can be characteristic of reference surfaces 50 that are based on polar or spherical coordinate systems.

In addition, the mapping functions, $f_1$ and $g_2$, may not be continuous at a singularity. For example, two points 80, 82, one of which is on each side of the seam 74 on the cylindrical reference surface 50, can be arbitrarily close together, although the corresponding points 84, 86 in the reference plane 48 into which 80, 82 are mapped by $g_2$ can be near opposite borders 76, 78 of the rectangular reference plane 48.

In order to accommodate such singularities, the reference plane instantiator 18 can effectively isolate the portions of curves in the reference plane 48 that cross through the singularities, such as the upper and lower reference plane borders 76, 78. For example, the reference plane instantiator 18 can create a piecewise definition of a curve in the reference plane 50, with the majority of curve portions, or pieces, lying exclusively in the interior of the reference plane 48 over which the mapping functions, $f_1$ and $g_2$, are continuous and have one-to-one correspondence. These curve portions, or pieces can be referred to as "ordinary curve segments." In addition, the reference plane instantiator 18 can introduce a "virtual curve segment" 88 in the reference plane 48 to connect a point 90 at which the curve intersects the upper border 76 to a point 92 at which the curve intersects the lower border 78.

The virtual curve segment 88 can act as a special seam-crossing marker, associating the corresponding points 90, 92 with each other. In actuality, the two points 90, 92 can correspond to a single point 94 along the seam 74 on the 3-D reference surface 50, and the virtual curve segment 88 can provide the required continuity in the mapping functions, $f_1$ and $g_2$, between the reference surface 46 and the reference plane 48. That is, the virtual curve segment 88 is an abstract curve segment that can be conceived of as lying completely within the singularity, corresponding to the point 94 where the curve crosses the seam 74. Thus, each curve that crosses the seam 74 on the reference surface 50 can be replaced by a combination of ordinary and virtual curve segments in the reference plane 48.

Interpreted literally, the virtual curve segment 88 would correlate to a circle 96 around the circumference of the cylindrical reference surface 50, as shown in FIG. 6. However, by convention, the reference plane instantiator 18 can modify the mapping functions, $f_1$ and $g_2$, to correlate the virtual curve segment 88 in the reference plane 48 to the common image, or point 94, of the two endpoints of the virtual curve segment 88 (points 90, 92). In addition, at the time the virtual curve segment 88 is created in the reference plane 50, the reference plane instantiator 18 can flag the virtual curve segment 88 so that the virtual curve segment 88 can be later identified and given special treatment during analysis.

Once the 2-D approximation, or reference plane 48, has been defined for the contoured surface 46, topological analyses regarding the contoured surface 46, including the definition of the tape courses 40, 42 (see FIG. 2) can be carried out in the reference plane 48. Afterward, the results of the analyses, including the tape course definitions, can be mapped back onto the contoured surface 46.

Figure 7:
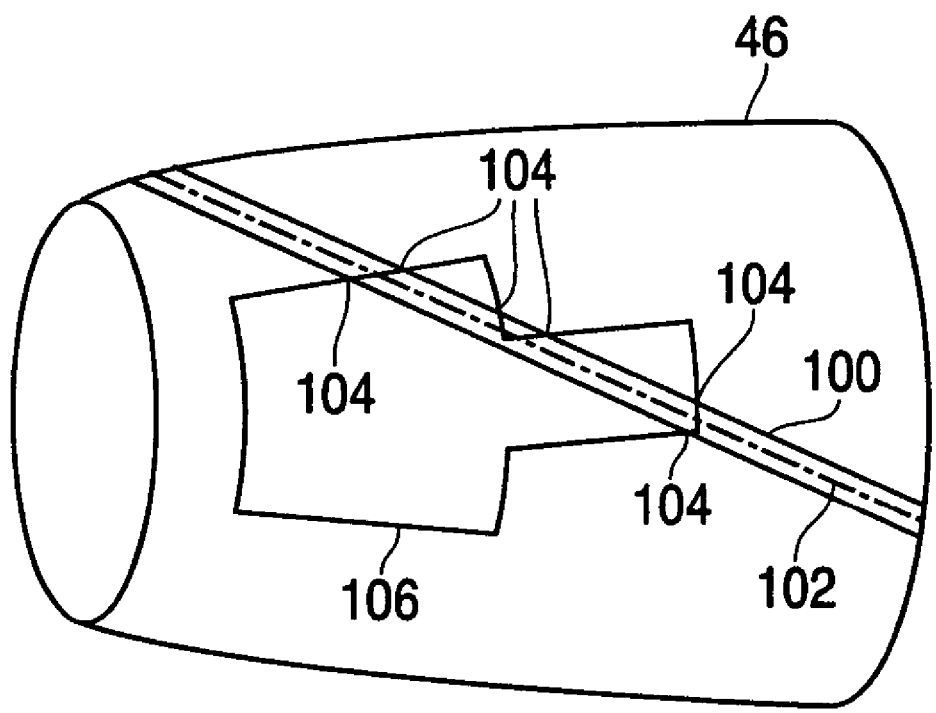
FIG. 7 is a perspective view illustrating a large, generally cylindrical composite part showing a composite ply boundary and a composite tape boundary along a tool path.

As illustrated in FIG. 7, the tape boundary plotter 20 (see FIG. 1) can plot a tentative tape boundary 100 on the contoured surface 46. The tape boundary 100 can be based on a corresponding tool path 102. For example, the tape boundary 100 can be plotted as a nominal tape width with a centerline that follows the tool path 102. The tape course can then be defined based on the intersections 104 of the tape boundary 100 with a corresponding ply boundary 106.

Figure 8:
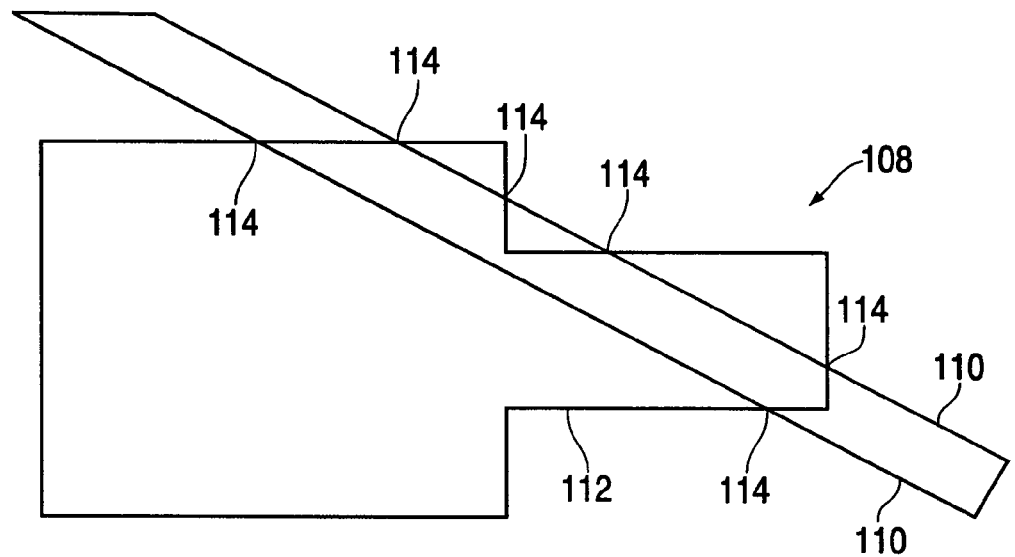
FIG. 8 is a diagrammatic representation of an image of a ply boundary and a tape boundary on a reference plane.

In order for the analysis of the tape course definition to be carried out in the reference plane 48, where the required computations can be significantly less complex than the equivalent computations on the contoured surface 46, the boundary mapper 22 (see FIG. 1) can map the tape boundary 100 and the ply boundary 106 into the reference plane 48 using the mapping functions, $g_1$ and $g_2$, or the equivalent function, g. Thus, the boundary mapper 22 can create a 2-D image in the reference plane 48, for example, the image 108 shown in FIG. 8. The image 108 can include a reference tape boundary 110 and a reference ply boundary 112.

In addition, the intersection locator 24 (see FIG. 1) can analyze the image 108 to determine the locations of the reference intersections 114 of the reference tape boundary 110 with the reference ply boundary 112. Because the analysis can take place in the 2-D reference plane, the curve-curve intersection solutions defining the locations of reference intersections 114 can be accurately and reliably determined using elementary mathematical computations.

Furthermore, the tape course delimiter 26 (see FIG. 1) can identify the flagged virtual curve segments 88 (refer to FIG. 6) in the reference plane 48 and not include the virtual curve segments 88 in the curve-curve intersection analysis. That is, the tape course delimiter 26 can determine the locations of the reference intersections 114 of the reference tape boundary 110 with the reference ply boundary 112 using only the ordinary curve segments. In effect, the virtual curve segments 88 are identified and simply ignored when testing for intersections of curves, or boundaries, in the reference plane 48.

Figure 9:
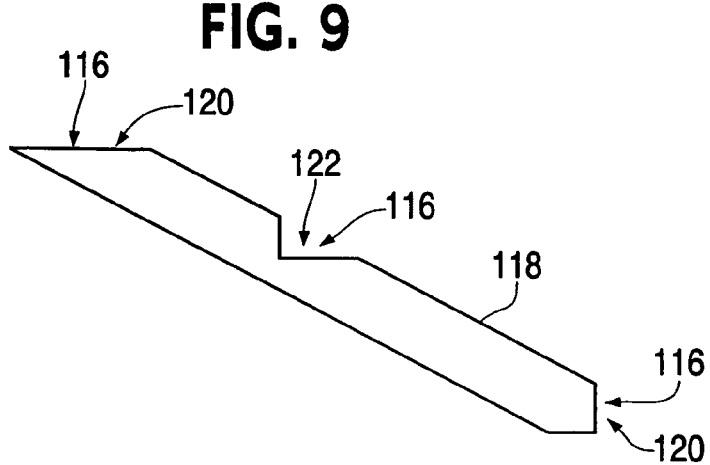
FIG. 9 is a diagrammatic representation of an image of a tape course on a reference plane.

Moreover, the tape course delimiter 26 (see FIG. 1) can define tape cut patterns 116, shown in FIG. 9, based on the locations of the reference intersections 114 and the definition of the portion of the reference ply boundary 112 inside the reference tape boundary 110. In order to identify points inside the reference tape boundary 110, or points inside the reference ply boundary 112, the tape course delimiter 26 can perform a point containment analysis. That is, the tape course delimiter 26 can determine if a given point in the reference plane 48 lies inside a given closed curve in the reference plane 48.

In particular, a point on the contoured surface 46 will lie inside the ply boundary 106 on the contoured surface 46 (see FIG. 7) if, and only if, the corresponding point in the reference plane 48 (correlated by the mapping functions, $g_1$ and $g_2$) lies inside the reference ply boundary 112 on the reference plane 48. Thus, the tape course delimiter 26 can solve the point containment problem by computations in the reference plane 48 rather than on the contoured surface 46.

In general, point containment in a planar region can be determined by creating a ray on the surface from a point on the surface to infinity, and determining the number of intersections of the ray and a closed curve of interest. Generally, if the number of intersections between the ray and the closed curve is odd, the point lies inside the closed curve; if the number of intersections is even, the point lies outside the closed curve. However, given the presence of singularities in the reference plane 48, the tape course delimiter 26 can perform a novel adaptation of this general point-containment algorithm.

The tape course delimiter 26 can cast a ray in the reference plane 48 from a point in the reference plane 48 in a direction that eventually will intersect a "real" border of the reference plane 48—for example, a reference plane border that corresponds to an actual border of the reference surface 50—if the point is inside a closed reference curve in the reference plane 48 corresponding to a closed curve on the reference surface 50. Once the ray has been cast in an appropriate direction, the tape course delimiter 26 can determine the number of intersections between the ray and the closed curve before it reaches the reference surface boundary.

As an example, in the case of the cylindrical reference surface 50 of FIG. 6, the ray cannot be cast in a vertical direction in the reference plane 48, because this can provide an erroneous result. For example, if a ray were cast upward from a point 124 inside a closed reference curve 126, the ray would have zero intersections with the closed reference curve 126 before reaching the upper border 76, even though the point 124 is inside the closed reference curve 126. Similarly, if a ray were cast downward from the point 124, the ray would intersect the closed curve 126 twice before reaching the lower border 78, even though the point 124 is inside the closed curve 126.

By the same token, in the case of the cylindrical reference surface 50 of FIG. 6, if a ray were cast upward from a point 128 outside but vertically aligned with the closed reference curve 126, the ray would have one intersection with the closed reference curve 126 before reaching the upper border 76, even though the point 128 is outside the closed reference curve 126. Similarly, if a ray were cast downward from the point 128, the ray would intersect the closed curve 126 only once before reaching the lower border 78, even though the point 124 is inside the closed curve 126.

Thus, for example, in the case of a cylindrical reference surface, the ray cast can be a straight line parallel to the axis of the reference surface 50, or a horizontal straight line in the reference plane 48, because the line must eventually reach a real border. Similarly, in the case of a swept reference surface, the ray cast can be a line running parallel to the axis of the reference surface 50. However, in the case of a different reference surface shape, the ray can be cast in any direction that will result in the ray eventually intersecting a real border of the reference plane 48 if the point of interest is inside a closed reference curve in the reference plane 48 corresponding to a closed curve on the reference surface 50.

Furthermore, the tape course delimiter 26 can define, or delimit, a reference tape course 118, shown in FIG. 9, including tape edge definitions, such as the tape cut patterns 116 and the portions of the reference tape boundary 110 between neighboring reference intersections 114. In addition, the tape course delimiter 26 can perform point containment analysis on the image 108 in the reference plane 48 to determine all of the points in the reference plane 48 that correspond to the reference tape course 118, including the points that comprise the tape edge definitions, as well as all points that lie within the area enclosed by the tape edge definitions.

Thus, the tape course delimiter 26 can conveniently define the reference tape course 118 in terms of the reference tape boundary 110 with areas trimmed away in accordance with the tape cut patterns 116. The tape cut patterns 116 can represent, for example, an "end cut" 120 that defines an end of the tape course 118, a "notch cut" 122 on one side of the tape course 118, or a "partial width cut" (also "non-full-width cut," which is not shown in the figures).

In addition, point containment determination for a set of tape courses inside a ply boundary 36, 38 (refer to FIG. 2) can be useful during composite part programming in order to facilitate updating a portion of the contoured surface 46 within the ply boundary 36, 38 to include an offset to account for the thickness of the layer of tape that forms the tape courses. That is, all points inside the ply boundary 36, 38 can be moved outward in a direction normal to the contoured surface 46. Thus, the composite part program can define a subsequent layer, or sequence of plies, to be applied over contoured surface 46. Similarly, point containment can be used in additional composite part program algorithms, for example, in order to recognize when a ply region has been exited when tracing a curve on the contoured surface 46.

After the reference tape course 118 has been defined, the tape course transformer 27 (see FIG. 1) can transform, or map, the reference tape course back onto the contoured surface 46. This transformation can be accomplished, for example, using mapping function, $f$, or equivalently, using the mapping functions, $f_1$ and $f_2$. The resulting tape course data can be used to generate CNC part programs that can be executed on a composite material application machine to manufacture a composite part.

Figure 10:
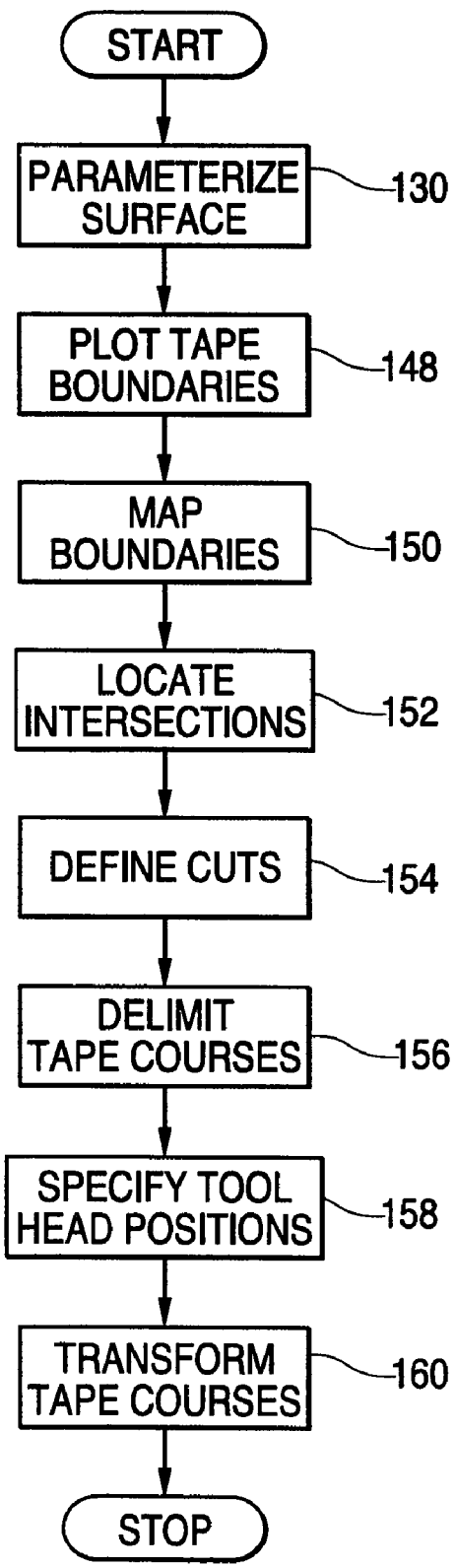
FIG. 10 is a flowchart illustrating steps that may be followed to generate tape courses in accordance with one embodiment of the method or process.

FIG. 10 is a flowchart illustrating a sequence of steps that can be performed in order to generate a tape course definition. The process can begin by proceeding to step number 130, "Parameterize Surface," in which a tape course generator can receive a manufacturing tool surface definition and multiple composite ply definitions associated with a composite part definition, as well as a set of machine-independent tool paths defined over the manufacturing tool surface. The tape course generator can parameterize the manufacturing tool surface definition, for example, following the sequence of steps illustrated in the flowchart of FIG. 11.

FIG. 11 is a flowchart illustrating a sequence of detail steps that can be performed in order to parameterize the manufacturing tool surface. In step 132, "Select Reference Surface," the tape course generator can select a relatively simple, 3-D reference surface shape that is substantially similar to the general shape of the contoured surface of the manufacturing tool. For example, as explained above, the tape course generator can select a relatively simple geometric surface. As a specific example, the tape course generator can select a circular cylinder to approximate a manufacturing tool for an airplane composite fuselage section.

The process can then continue to step 134, "Project Normal Rays," where the tape course generator can superimpose the contoured surface, or manufacturing tool surface, over the reference surface and cast, or project, rays normal to the reference surface or normal to the axis of the reference surface. For example, as explained above, in the case where the reference surface is a cylinder or a swept surface with circular cross sections, the tape course generator can project rays from the axis of the cylinder, or from the spine of the swept surface, to the reference surface.

Then, in step 136, "Map Surface onto Reference Surface," the tape course generator can define a mapping function, $f_2$, that maps the reference surface onto the contoured surface. For example, as described above, the tape course generator can identify the correlated points where each of the normal rays intersects the reference surface 50 and the contoured surface 46 to derive the mapping function, $f_2$, mapping the reference surface onto the contoured surface based on the measured distances. As explained above, the tape course generator can then define a mapping function, $g_1$, as the inverse of the mapping function, $f_2$, to map the contoured surface onto the reference surface.

Next, in step 138, "Interpolate Gaps," the tape course generator can adjust the mapping function, $f_2$, to ensure the resulting mapping functions, $g_1$ and $f_2$, are continuous by interpolating between the tips of partial surfaces in a region where an unintended gap exists between partial surfaces defining the manufacturing tool surface. Similarly, in order to ensure that the reference surface has a one-to-one correspondence with the contoured surface, that is, mapping functions, $g_1$ and $f_2$, are uniquely defined on the respective surfaces, in step 140, "Disambiguate Overlaps," the tape course generator can adjust the mapping function, $f_2$, by calculating a weighted average of multiple intersection points of the cast ray with multiple partial surfaces in a region where unintended overlaps of partial surfaces defining the manufacturing tool surface exist.

Subsequently, in step 142, "Select Reference Plane," the tape course generator can effectively unroll, unfold, or flatten out the reference surface to create a reference plane that corresponds to the reference surface. For example, in the case of the cylindrical reference surface, as explained above, the tape course generator can select a rectangular reference plane that can be effectively wrapped around the cylindrical reference surface.

The tape course generator can in turn apply a conventional parametric equation, or set of equations, to map the reference plane onto the reference surface in step 144, "Map Reference Surface onto Reference Plane." In addition, as explained above, the tape course generator can define a mapping function, $g_2$, as the inverse of the mapping function, $f_1$, to map the reference surface onto the reference plane.

As described above, the reference plane can contain regions with singularities, such as locations at which the mapping functions, $f_1$ and $g_2$, correlate two points, lines, or curves in the reference plane 48 to a single point, line or curve on the reference surface; or locations where two points on each side of a seam on the cylindrical reference surface can be near opposite borders of the rectangular reference plane. Accordingly, the tape course generator can later introduce a "virtual curve segment" in the reference plane, in step 146, "Define/Flag Virtual Curves," in order to connect a point at which a curve in the plane intersects the upper border of the plane with a point at which the curve intersects the lower border. As explained above, the virtual curve segment can act as a special seam-crossing marker.

Once the manufacturing tool surface has been parameterized in step 130, returning to FIG. 10, the tape course generator can plot tentative tape boundaries on the contoured surface based on the corresponding tool paths in step 148, "Plot Tape Boundaries." Then, in step 150, "Map Boundaries," the tape course generator can map the tape boundaries and a ply boundary (received in the composite ply definition) into the reference plane using the mapping functions, $g_1$ and $g_2$.

Next, in step 152, "Locate Intersections," as described above, the tape course generator can determine the locations of reference intersections of the resulting reference tape boundary with the resulting reference ply boundary. However, as explained above, the tape course generator can ignore the flagged virtual curve segments in the curve-curve intersection analysis. Subsequently, in step 154, "Define Cuts," the tape course generator can define tape cut patterns based on the locations of the reference intersections, and then delimit the tape courses in step 156, "Delimit Tape Courses," defining the tape edges, for example, in terms of the corresponding reference tape boundary having areas trimmed away in accordance with the tape cut patterns. During this step, as explained above, the tape course generator can further perform point containment analysis to identify all the points that form the tape courses.

Additionally, in step 158, "Specify Tool Head Positions," in association with tape end cut locations, the tape course generator can specify a series of composite material application head actuation requirements, such as a composite material application head-up location at a tape course end in the direction from which the composite material application head will approach the tape course, and a head-down location at an opposite tape course end.

Afterward, in step 160, "Transform Tape Courses," the tape course generator can transform, or map, the reference tape course back onto the contoured surface, for example, using the mapping functions, $f_1$ and $f_2$. The resulting tape course data can be used to generate CNC part programs that can be executed on a composite material application machine to manufacture a composite part.

FIGS. 1, 10 and 11 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 28, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of defining a composite tape course to form at least a portion of a composite part ply, the method being performed by computer-executable instructions stored in a computer readable storage medium that, when executed on a processor, perform the steps of:
  approximating a contoured surface with a reference plane;
  selecting a three-dimensional reference surface to approximate the contoured surface;
  defining a first function to correlate a first point from the contoured surface to a first intermediate point on the reference surface;
  selecting the reference plane to approximate the reference surface;
  defining a second function to correlate the first intermediate point to a reference point in the reference plane;
  mapping a ply boundary from the contoured surface to a reference ply boundary in the reference plane;
  mapping a tape boundary from the contoured surface to a reference tape boundary in the reference plane;
  defining a tape edge based at least in part on a reference intersection of the reference ply boundary and the reference tape boundary; and
  forming at least a portion of the composite part ply using the defined tape edge.

2. The computer-implemented method of claim 1, further comprising defining a reference function based on the first function and on the second function to correlate the first point on the contoured surface to the reference point in the reference plane.

3. The computer-implemented method of claim 1, wherein the first function is defined to be continuous over the reference surface and the second function is defined to be continuous over the reference plane except at one or more borders of the reference plane.

4. The computer-implemented method of claim 3, wherein defining the first function further comprises:
  interpolating between at least a second point on the contoured surface and a third point on the contoured surface to define an interpolated point; and
  correlating the interpolated point to a second intermediate point on the reference surface using the second function, wherein the contoured surface is not defined between the second point and the third point.

5. The computer-implemented method of claim 1, wherein the step of defining the first function comprises establishing a one-to-one correspondence between the contoured surface and the reference surface.

6. The computer-implemented method of claim 5, wherein the step of defining the first function further includes disambiguating the first point, wherein the first function otherwise would correlate at least a second point on the contoured surface and a third point on the contoured surface to the first intermediate point.

7. The computer-implemented method of claim 6, wherein disambiguating the first point includes calculating a weighted average based at least in part on the second point and on the third point.

8. The computer-implemented method of claim 1, further comprising:
  defining a first inverse function based on the first function to correlate the reference point to the first intermediate point; and
  defining a second inverse function based on the second function to correlate the first intermediate point to the first point on the contoured surface.

9. The computer-implemented method of claim 8, further comprising defining an inverse reference function based on the first inverse function and on the second inverse function to correlate the reference point in the reference plane to the first point on the contoured surface.

10. The computer-implemented method of claim 1, wherein the reference surface includes at least one parametric surface.

11. The computer-implemented method of claim 10, wherein the parametric surface comprises at least one selected from the following:
  a cylinder, a sphere, a hemisphere, a cone, a polyhedron, a torus, a spheroid, an ellipsoid, a paraboloid, a hyperboloid, a swept surface and a general spline surface.

12. The computer-implemented method of claim 1, farther comprising defining a virtual curve that connects a first reference boundary point on a first corresponding border of the reference plane to a second reference boundary point on a second corresponding border of the reference plane, wherein the first and second corresponding borders both correlate to a seam on the reference surface and the first and second reference boundary points both correlate to a single intermediate boundary point on the seam.

13. The computer-implemented method of claim 12, farther comprising:
  flagging the virtual curve to identify the virtual curve; and
  ignoring the virtual curve when plotting a corresponding reference boundary.

14. The computer-implemented method of claim 12, farther comprising:
  flagging the virtual curve to identify the virtual curve; and
  ignoring the virtual curve when testing for an intersection of a corresponding reference boundary and a line in the reference plane.

15. The computer-implemented method of claim 1, further comprising determining a location of the intersection of the reference ply boundary and the reference tape boundary.

16. The computer-implemented method of claim 1, farther comprising defining a tape cut based at least in part on the defined tape edge.

17. The computer-implemented method of claim 1, further comprising defining a composite material application head actuation location based at least in part on the defined tape edge.

18. The computer-implemented method of claim 1, further comprising:
  casting a ray in a predetermined direction from a reference point in the reference plane, wherein the predetermined direction ensures that the ray intersects a real border of the reference plane that does not correlate to a seam on the reference surface;
  quantifying a number of intersections of the ray and a closed curve in the reference plane;
  and determining if the reference point is contained within the closed curve based on the number of intersections.

19. A system for defining a composite tape course to form at least a portion of a composite part ply, comprising:
  a processor configured to:
    approximate a contoured surface with a reference plane;
    select a three-dimensional reference surface to approximate the contoured surface;
    define a first function to correlate a first point from the contoured surface to a first intermediate point on the reference surface;
    select the reference plane to approximate the reference surface; and
    define a second function to correlate the first intermediate point to a reference point in the reference plane;
    map a ply boundary from the contoured surface to a reference ply boundary in the reference plane;
    map a tape boundary from the contoured surface to a reference tape boundary in the reference plane;

define a tape edge based at least in part on an reference intersection of the reference ply boundary and the reference tape boundary; and
send a tape course definition; and
a material application machine configured to receive the tape course definition from the processor.

20. The system of claim 19, wherein the predetermined operations further comprise defining a reference function based on the first function and on the second function to correlate the first point on the contoured surface to the reference point in the reference plane.

21. The system of claim 19, wherein the first function is defined to be continuous over the reference surface and the second function is defined to be continuous over the reference plane except at one or more borders of the reference plane.

22. The system of claim 21, wherein the predetermined operation of defining the first function further comprises:
interpolating between at least a second point on the contoured surface and a third point on the contoured surface to define an interpolated point; and
correlating the interpolated point to a second intermediate point on the reference surface using the second function, wherein the contoured surface is not defined between the second point and the third point.

23. The system of claim 19, wherein the step of defining the first function comprises establishing a one-to-one correspondence between the contoured surface and the reference surface.

24. The system of claim 23, wherein the predetermined operation of defining the first function further includes disambiguating the first point, wherein the first function otherwise would correlate at least a second point on the contoured surface and a third point on the contoured surface to the first intermediate point.

25. The system of claim 24, wherein the predetermined operation of disambiguating the first point includes calculating a weighted average based at least in part on the second point and on the third point.

26. The system of claim 19, wherein the predetermined operations further comprise:
defining a first inverse function based on the first function to correlate the reference point to the first intermediate point; and
defining a second inverse function based on the second function to correlate the first intermediate point to the first point on the contoured surface.

27. The system of claim 26, wherein the predetermined operations further comprise defining an inverse reference function based on the first inverse function and on the second inverse function to correlate the reference point in the reference plane to the first point on the contoured surface.

28. The system of claim 19, wherein the reference surface includes at least one parametric surface.

29. The system of claim 28, wherein the parametric surface comprises at least one selected from the following:
a cylinder, a sphere, a hemisphere, a cone, a polyhedron, a torus, a spheroid, an ellipsoid, a paraboloid, a hyperboloid, a swept surface and a general spline surface.

30. The system of claim 19, wherein the predetermined operations further comprise defining a virtual curve that connects a first reference boundary point on a first corresponding border of the reference plane to a second reference boundary point on a second corresponding border of the reference plane, wherein the first and second corresponding borders both correlate to a seam on the reference surface and the first and second reference boundary points both correlate to a single intermediate boundary point on the seam.

31. The system of claim 30, wherein the predetermined operations further comprise:
flagging the virtual curve to identify the virtual curve; and
ignoring the virtual curve when plotting a corresponding reference boundary.

32. The system of claim 30, wherein the predetermined operations further comprise:
flagging the virtual curve to identify the virtual curve; and
ignoring the virtual curve when testing for an intersection of a corresponding reference boundary and a line in the reference plane.

33. The system of claim 19, wherein the predetermined operations further comprise determining a location of the intersection of the reference ply boundary and the reference tape boundary.

34. The system of claim 19, wherein the predetermined operations further comprise defining a tape cut based at least in part on the defined tape edge.

35. The system of claim 19, wherein the predetermined operations further comprise defining a composite material application head actuation location based at least in part on the defined tape edge.

36. A tape course generator for defining a composite tape course to form at least a portion of a composite part ply, comprising:
a processor;
a memory containing computer-executable instructions;
a reference surface parameterizer being stored in the memory and executable on the processor and being configured to approximate a contoured surface with a reference surface, map a ply boundary from the contoured surface to an intermediate ply boundary on the reference surface, and map a tape boundary from the contoured surface to an intermediate tape boundary on the reference surface;
a reference plane instantiator configured to approximate the reference surface with a reference plane, map the intermediate ply boundary to a reference ply boundary in the reference plane, and map the intermediate tape boundary to a reference tape boundary in the reference plane; and
a tape course delimiter configured to define tape edge based at least in part on a reference intersection of the reference ply boundary and the reference tape boundary.

37. The tape course generator of claim 36, wherein the reference surface parameterizer is further configured to select a three-dimensional reference surface to approximate the contoured surface and define a first function to correlate a first point from the contoured surface to a first intermediate point on the reference surface.

38. The tape course generator of claim 37, wherein the first function is defined to be continuous over the reference surface and a second function is defined to be continuous over the reference plane except at one or more borders of the reference plane.

39. The tape course generator of claim 38, wherein the reference surface parameterizer is further configured to interpolate between at least a second point on the contoured surface and a third point on the contoured surface to define an interpolated point, and correlate the interpolated point to a second intermediate point on the reference surface using the second function, wherein the contoured surface is not defined between the second point and the third point.

40. The tape course generator of claim 37, wherein the first function comprises establishing a one-to-one correspondence between the contoured surface and the reference surface.

41. The tape course generator of claim 40, wherein the reference surface parameterizer is further configured to calculate a weighted average based at least in part on a second point on the contoured surface and on a third point on the contoured surface, wherein the first function otherwise would correlate at least the second point and the third point on the contoured surface to the first intermediate point.

42. The tape course generator claim 37, wherein the reference plane instantiator is further configured to select the reference plane to approximate the reference surface and define a second function to correlate the first intermediate point to a reference point in the reference plane.

43. The tape course generator of claim 42, wherein the reference plane instantiator is further configured to define a first inverse function based on the first function to correlate the reference point to the first intermediate point and to define a second inverse function based on the second first function to correlate the first intermediate point to the first point on the contoured surface.

44. The tape course generator of claim 36, wherein the reference surface includes at least one parametric surface.

45. The tape course generator of claim 44, wherein the parametric surface comprises at least one selected from the following:

a cylinder, a sphere, a hemisphere, a cone, a polyhedron, a torus, a spheroid, an ellipsoid, a paraboloid, a hyperboloid, a swept surface and a general spline surface.

46. The tape course generator of claim 36, wherein the reference plane instantiator is further configured to define a virtual curve that connects a first reference boundary point on a first corresponding border of the reference plane to a second reference boundary point on a second corresponding border of the reference plane, wherein the first and second corresponding borders both correlate to a seam on the reference surface and the first and second reference boundary points both correlate to a single intermediate boundary point on the seam.

47. The tape course generator of claim 46, wherein the reference plane instantiator is further configured to flag the virtual curve to identify the virtual curve and to ignore the virtual curve when plotting a corresponding reference boundary.

48. The tape course generator of claim 46, wherein the reference plane instantiator is further configured to flag the virtual curve to identify the virtual curve and ignore the virtual curve when testing for an intersection of a corresponding reference boundary and a line in the reference plane.

49. The tape course generator of claim 36, further comprising an intersection locator configured to determine a location of the intersection of the reference ply boundary and the reference tape boundary.

50. The tape course generator of claim 36, wherein the tape course delimiter is farther configured to define a tape cut based at least in part on the defined tape edge.

51. The tape course generator of claim 36, wherein the tape course delimiter is farther configured to define a composite material application head actuation location based at least in part on the defined tape edge.

52. The tape course generator of claim 36, wherein the tape course delimiter is further configured to cast a ray in a predetermined direction from a reference point in the reference plane, quantify a number of intersections of the ray and a closed curve in the reference plane, and determine if the reference point is contained within the closed curve based on the number of intersections, wherein the predetermined direction ensures that the ray intersects a real border of the reference plane that does not correlate to a seam on the reference surface.

* * * * *

UNITED STATES PATENT AND TRADEMARK OFFICE
CERTIFICATE OF CORRECTION

PATENT NO.       : 7,643,970 B2                                          Page 1 of 1
APPLICATION NO.  : 11/269834
DATED            : January 5, 2010
INVENTOR(S)      : Drumheller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-first Day of December, 2010

David J. Kappos
*Director of the United States Patent and Trademark Office*